United States Patent [19]
Vulliet et al.

[11] 3,860,384
[45] Jan. 14, 1975

[54] METHOD TO CONTROL $NO_x$ FORMATION IN FOSSIL-FUELED BOILER FURNACES

[75] Inventors: William G. Vulliet, Poway; Wolfram G. Schuetzenduebel, Rancho Santa Fe, both of Calif.

[73] Assignee: Intelcon Rad Tech, San Diego, Calif.

[22] Filed: May 25, 1972

[21] Appl. No.: 256,974

[52] U.S. Cl.................. 431/4, 431/190, 60/DIG. 11
[51] Int. Cl.............................................. F23j 7/00
[58] Field of Search......... 431/4, 11, 116, 164, 167, 431/190, 215, 351

[56] References Cited
UNITED STATES PATENTS

| | | | |
|---|---|---|---|
| 2,576,373 | 11/1951 | Wetzel | 431/167 X |
| 3,088,280 | 5/1963 | Lefebvre et al | 60/39.55 X |
| 3,099,698 | 7/1963 | Ramacciotti | 432/20 |

FOREIGN PATENTS OR APPLICATIONS

| | | | |
|---|---|---|---|
| 476,195 | 12/1937 | Great Britain | 60/39.55 |

OTHER PUBLICATIONS

"Formation and Control of Oxides of Nitrogen Emissions From Gas Turbine Combustion Systems," Singh et al., Journal of Eng. for Power, 10–71 pp. 271–278, 3–72.

"Inlet Manifold Water Injection For Control Of Nitrogen Oxides . . . " SAE Transactions, Vol. 78, Jan. 1969, No. 690018.

"Effect of Engine Intake Air . . . Emissions," SAE Transactions, Vol. 79, Jan. 1970, No. 700107.

"Humidity Effects on Engine Nitric Oxide Emissions . . . " SAE Transactions, Vol. 79, May, 1970, No. 700467.

*Primary Examiner*—Charles J. Myhre
*Assistant Examiner*—William C. Anderson
*Attorney, Agent, or Firm*—Fitch, Even, Tabin & Luedeka

[57] ABSTRACT

The invention is directed to a method and apparatus for reducing the nitrogen oxide content of flue gases produced during operation of an external combustion engine or furnace. In the method moisture is dispersed into preheated combustion air prior to entrance of the combustion air into the combustion chamber of an external combustion engine or furnace.

3 Claims, 1 Drawing Figure

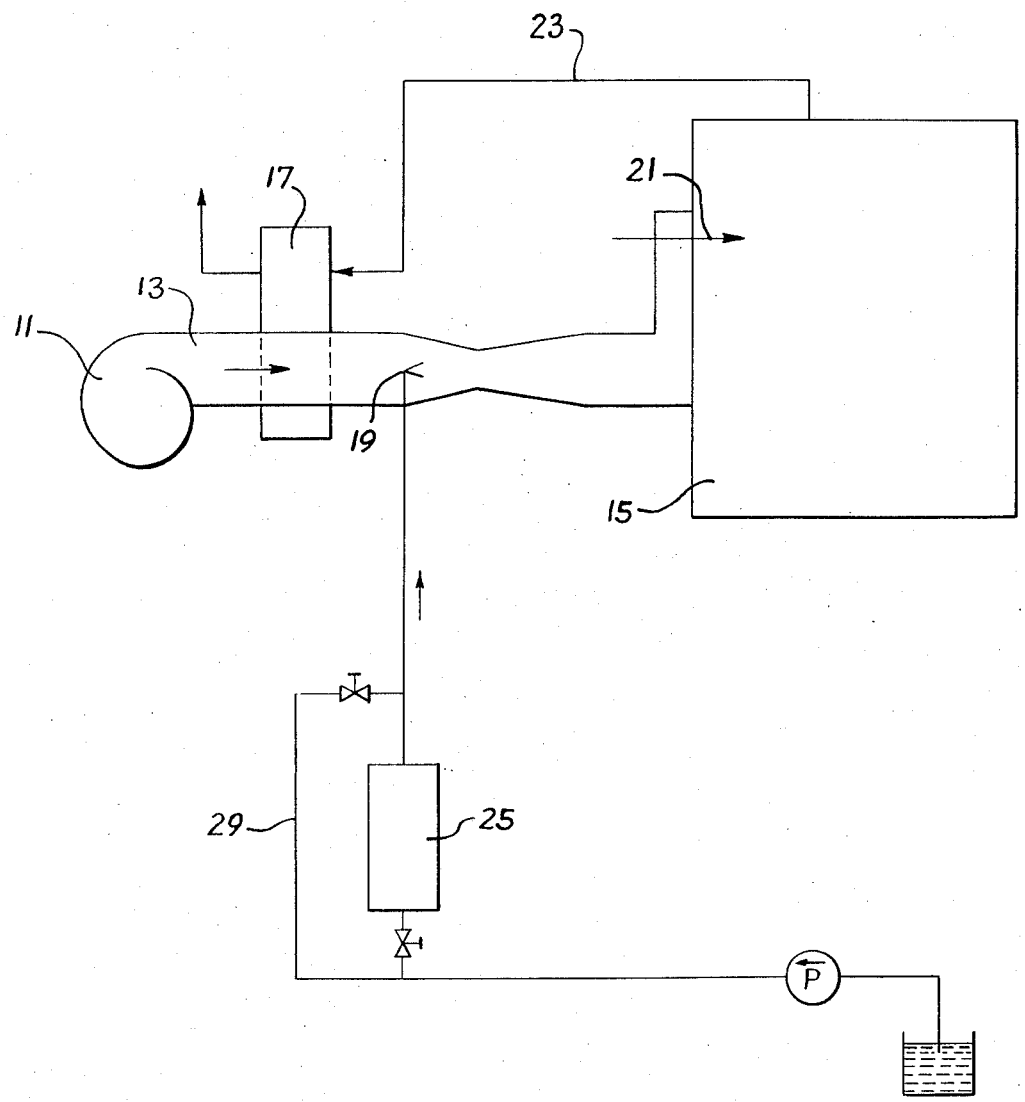

METHOD TO CONTROL NO$_x$ FORMATION IN FOSSIL-FUELED BOILER FURNACES

The present invention relates generally to a method and apparatus for reducing nitrogen oxides in flue gas produced during burning of fuel in a combustion chamber. More particularly, the present invention is directed to a method and apparatus for reducing nitrogen oxides in flue gas produced by an external combustion engine or furnace.

An external combustion engine or furnace generally includes at least one burner device located in a combustion chamber and communicating with at least one fuel supply duct and at least one combustion air supply duct. The combustion air supply duct is usually linked to the burner by one or more preheaters. The outlet of the combustion chamber containing flue gases generally communicates with the preheater in a manner by which the combustion air and the flue gases are capable of exchanging heat.

As compared with internal combustion engines, external combustion engines have the advantage that the flue gases are considerably purer in that they contain less carbon monoxide and less nitrogen oxides. However, even a small quantity of nitrogen oxides may be harmful to health and it is therefore desirable to reduce the level of nitrogen oxides below that which is usually produced in an external combustion engine.

Two basic methods are known for reduction of nitrogen oxides production in external combustion engines. Both methods accomplish the reduction of nitrogen oxides by lowering of the flame temperature. The most commonly used method accomplishes temperature reduction of the flame by increasing the combustion volume and the combustion chamber surface area to which the flame radiates. This produces lower temperature during the combustion process. Two-stage combustion and off-stoichiometric operation are examples of this method. The extent to which this method can be applied is limited by other associated problems, such as increased carbon monoxide production, flame instability and tube burnout in the case of water-cooled furnaces.

A second method for reducing nitrogen oxides in flue gas from external combustion engines makes use of an increase in the heat capacity of the combustion products. This also reduces the flame temperature for a given fuel and fuel-air ratio. This method usually has the least adverse effect on other aspects of furnace operation and is potentially capable of the largest nitrogen oxides abatement. An example of this method is to recycle a portion of the flue gas with the combustion air. To avoid combustion instability problems, the portion of flue gas that can be recycled with the combustion air is limited to about 25 percent of the total volume of combustion gases entering the combustion chamber. The use of flue gas recycling is effective in reducing nitrogen oxides formation but requires large capital expenditures to provide the necessary equipment for recycling.

It would be desirable to provide a simple, inexpensive and effective method and apparatus for reducing nitrogen oxides formation in the flue gas of external combustion engines. Accordingly, it is the principal object of the present invention to provide a method and apparatus for reducing the amount of nitrogen oxides in the flue gases of external combustion furnaces and engines.

It is another object of the present invention to provide simple and inexpensive means for limiting the amount of nitrogen oxides in the flue gases of external combustion engines or furnaces.

These and other objects of the present invention will become more apparent from the following detailed disclosure and the accompanying drawing which is a schematic representation of an external combustion engine or furnace utilizing the method of the present invention for reducing nitrogen oxides in the flue gases.

Generally, the present invention is directed to a method and apparatus for reducing the nitrogen oxide content of flue gases by dispersing moisture into combustion air prior to entrance of the combustion air into a combustion chamber in an external combustion engine or furnace. The level of moisture which is introduced into the preheated combustion air is substantially in excess of that moisture which would be present due to the ambient humidity of the combustion air. The amount of moisture is also substantially in excess of the amount of moisture that would be present in combustion air when a portion of the flue gases is recycled and mixed with the combustion air prior to combustion in the combustion chamber.

The level of moisture added in accordance with the present invention is sufficient to provide from about 2 percent to about 6 percent by weight of moisture based upon the total weight of the combustion air. As indicated, this is a substantially higher level of moisture than is present due to the ambient humidity of the air and is also substantially higher than the amount of moisture that would be added by using up to about 25 percent of flue gas mixed with the combustion air.

The combustion air is heated prior to adding moisture thereto. In this connection, the combustion air is heated to a temperature such that the relative humidity of the combustion air after addition of the moisture thereto is less than about 25 percent. At the lowest level of moisture useful in the practice of the present invention, the combustion air is heated to a temperature of at least about 120°F to provide a relative humidity of less than about 25 percent. A moisture addition levels of 6 percent, the combustion air is heated to a temperature of at least about 165°F to provide the desired relative humidity. It has been found that if the relative humidity of the combustion air is above about 25 percent after evaporation of the added moisture is attained, that such evaporation may not be complete prior to introducing the combustion air into the combustion chamber. Under such conditions the combustion air contains unevaporated moisture droplets. The presence of unevaporated moisture droplets is very detrimental to proper fuel combustion resulting in uneven burning and localized cold spots. It is preferred that the combustion air be heated to a temperature of at least about 200°F prior to adding the moisture thereto. At temperatures above about 200°F the amount of moisture added for purposes of reducing nitrogen oxides in the flue gas is completely evaporated in the combustion air and is thoroughly mixed therewith prior to introducing the combustion air into the combustion chamber. There is no upward limit on the temperature to which the combustion air is heated. However, it is usually not practical to heat the combustion air above about 500°F.

The invention will now be described more fully with reference to the drawing. Referring to the drawing, a blower 11 is used to force combustion air into a duct 13 which feeds the air into a combustion chamber 15. An air preheater 17 is used to heat the incoming combustion air to a temperature of from about 200°F to about 500°F. Water is introduced into the duct 13 by means of a spray nozzle 19. Fuel is introduced into the combustion chamber 15 at 21. Flue gas from combustion within the combustion chamber exits from the combustion chamber and passes by means of duct 23 to preheater 17.

The water is preferably passed through a demineralizer 25 prior to being introduced into duct 13. The water is preferably demineralized to avoid buildup of deposits within the duct 13. However, bypass line 29 may be used to bypass the demineralizer 25 and demineralizer 25 is an optional feature of the present invention.

The addition of moisture to the preheated air prior to introducing the preheated combustion air into the combustion chamber provides thorough and intimate mixing of the water with the air. The water is completely evaporated and is in a gaseous state at the time that the combustion air is introduced into the combustion chamber. The presence of the moisture vapor in the combustion air increases the heat capacity of the combustion mixture and thus reduces the effective temperature of combustion. The lowering of the combustion temperature results in a decrease in the level of nitrogen oxides which are produced during combustion.

If the moisture is substantially greater than about 6 percent by weight the heat capacity of the combustion air mixture becomes too great and furnace efficiency is reduced to an unacceptable extent. At levels of addition of moisture of less than about 2 percent there is insufficient reduction in the amount of nitrogen oxides to warrant the addition of the moisture. In this connection, use of about 2 percent additional moisture in the combustion air results in decreasing the nitrogen oxide production level by from about 40 percent to about 50 percent of its original value. The addition of about 4 percent moisture in the combustion air decreases the nitrogen oxide production by from about 50 percent to about 80 percent of its original value. The percentage reduction is greater for natural gas fuel than for oil fuel but the level of reduction of nitrogen oxides is substantial even for oil fuel.

As an example of the practice of the present invention moisture is introduced into the combustion air of a 100 megawatt natural gas fired steam generator. The combustion air is heated to a temperature of 500° F prior to adding the moisture thereto. The following table summarizes the efficiency of the present invention in reducing nitric oxide production in external combustion engines:

TABLE

| LOAD MEGAWATT | MOISTURE ADDED WEIGHT PERCENT | EFFICIENCY LOSS (PERCENT) | NITRIC OXIDES IN FLUE GAS (PARTS PER MILLION) |
| --- | --- | --- | --- |
| 105 | 0 | 0 | 325 |
|  | 2 | 1.6 | 175 |
|  | 4 | 3.2 | 98 |
| 74 | 0 | 0 | 213 |
|  | 2 | 1.6 | 120 |
|  | 4 | 3.2 | 74 |
| 40 | 0 | 0 | 118 |
|  | 2 | 1.6 | 75 |
|  | 4 | 3.2 | 54 |

It will be apparent from the foregoing, that the method and apparatus of the present invention provides an extremely simple means for controlling nitrogen oxide in the flue gas of external combustion furnaces.

What is claimed is:

1. A method for reducing the nitrogen oxide content of the flue gas of external combustion furnaces comprising preheating the combustion air and thereafter adding to said preheated combustion air prior to introduction of said preheated combustion air into a combustion chamber a predetermined level of moisture, said moisture being added at a level of from about 2 percent by weight to about 6 percent by weight of said combustion air, said combustion air being preheated to a temperature such that the relative humidity of the combustion air after addition of said moisture is less than about 25 percent and said moisture being fully evaporated prior to introduction of said combustion air into said combustion chamber.

2. A method in accordance with claim 1 wherein said combustion air is preheated to a temperature of at least about 120°F prior to addition of said moisture.

3. A method in accordance with claim 1 wherein said combustion air is preheated to a temperature of at least about 200° F prior to addition of said moisture.

* * * * *